United States Patent
Ronca et al.

(10) Patent No.: US 8,954,596 B2
(45) Date of Patent: Feb. 10, 2015

(54) DYNAMIC VIRTUAL CHUNKING OF STREAMING MEDIA CONTENT

(75) Inventors: David R. Ronca, Campbell, CA (US); Kay Neuenhofen, San Francisco, CA (US); James M. Zollinger, San Jose, CA (US)

(73) Assignee: Netflix, Inc., Los Gatos, CA (US)

( * ) Notice: Subject to any disclaimer, the term of this patent is extended or adjusted under 35 U.S.C. 154(b) by 1085 days.

(21) Appl. No.: 12/753,761

(22) Filed: Apr. 2, 2010

(65) Prior Publication Data

US 2011/0246616 A1 Oct. 6, 2011

(51) Int. Cl.
*G06F 15/16* (2006.01)
*H04N 21/262* (2011.01)
*H04N 21/472* (2011.01)
*H04N 21/6587* (2011.01)
*H04N 21/845* (2011.01)

(52) U.S. Cl.
CPC ... *H04N 21/26258* (2013.01); *H04N 21/47202* (2013.01); *H04N 21/6587* (2013.01); *H04N 21/8456* (2013.01)
USPC ........... 709/231; 709/230; 709/232; 709/233; 709/234; 709/235

(58) Field of Classification Search
USPC .................................. 709/230–235
See application file for complete search history.

(56) References Cited

U.S. PATENT DOCUMENTS

| | | | |
|---|---|---|---|
| 6,490,627 B1 * | 12/2002 | Kalra et al. ................... | 709/231 |
| 2002/0152317 A1 * | 10/2002 | Wang et al. ................... | 709/231 |
| 2002/0194260 A1 * | 12/2002 | Headley et al. ............... | 709/203 |
| 2003/0055995 A1 * | 3/2003 | Ala-Honkola ................ | 709/231 |
| 2003/0061305 A1 * | 3/2003 | Copley et al. ................ | 709/217 |
| 2004/0003103 A1 * | 1/2004 | Witt et al. ..................... | 709/231 |
| 2004/0049596 A1 * | 3/2004 | Schuehler et al. ............ | 709/238 |

* cited by examiner

*Primary Examiner* — Edward Kim
(74) *Attorney, Agent, or Firm* — Patterson + Sheridan, LLP

(57) ABSTRACT

Techniques are disclosed for a client device to stream a user-selected media file from a content server. The client device may create a playlist of dynamic virtual chunks to represent a single media stream file on a streaming media server. The playlist itself may be generated from an index in the header of a given stream defining what chunks, or segments of multiplexed audiovisual content, are present within that stream. The playlist of dynamic virtual chunks provides the playback engine on the client device with a list of individual files that may be requested from the streaming server independently of one another, despite the stream being stored on the server as a single media stream file.

27 Claims, 9 Drawing Sheets

DYNAMIC VIRTUAL CHUNKING OF STREAMING MEDIA CONTENT

BACKGROUND OF THE INVENTION

1. Field of Invention

Embodiments of the present invention generally relate to techniques for streaming media to a client device and, more specifically, to a digital content distribution system for dynamic virtual chunking of streaming media content.

2. Description of Related Art

Digital content distribution systems typically include a content server, a content player, and a communications network connecting the content server to the content player. The content server is configured to store files (or "streams") available for download from the content server to the content player. Each stream may provide a digital version of, e.g., a movie, a television program, a sporting event, a staged or live event captured by recorded video, etc. Streams may also provide media content created specifically for distribution online. Content files stored on the content server typically are typically organized according to playback chronology and may store audio data and/or video data.

Playback frequently involves a technique known as "streaming," where a content server transmits portions of a stream to a content player, which in turn decodes and initiates playback on the a client device while subsequent portions of the stream are received. To account for variable latency and bandwidth within the communications network, a content buffer on the client device may be used to queue incoming portions of the stream ahead of the portions actually being played. During moments of network congestion (which leads to lower available bandwidth) less data is added to the buffer, which may drain down as data is being de-queued to support playback at a certain playback bit rate. However, during moments of high network bandwidth, the buffer is replenished and additional buffer time is added until the buffer is generally full again. In practical systems, the buffer may queue data corresponding to a time span ranging from seconds to more than a minute.

Streaming digitally encoded audiovisual (AV) programs (including feature length films and television programs) over the Internet has become popular as the availability of high-bandwidth Internet communication has increased, and a variety of different streaming media protocols are available for transmitting media streams to the client. Although many of these protocols were conceived of to transmit media streams from a server to a conventional computing system (e.g., a typical desktop PC or laptop computer), the streaming approach is also being used to transmit streaming media to a variety of end-user client devices; including, e.g., mobile telephones, tablet and netbook computing devices, console and handheld video game systems, digital video recorders (DVRs), DVD players, and dedicated media streaming devices, (e.g., the Roku® set-top box), etc.

SUMMARY OF THE INVENTION

One embodiment of the invention disclosed herein provides a method for streaming a media file to a client device. The method may generally include retrieving a header for each of one or more multiplexed audiovisual (AV) streams available from a content server. The AV streams may each encode a media title (e.g., a movie) at a different bit rate. Further, each header may store an index describing the encoding of the audiovisual data in the corresponding stream as a plurality of chunks. The method may also include generating, from the header(s) associated with the multiplexed AV stream(s), a playlist containing a list of URLs used to stream the plurality of chunks of audiovisual data to the client device. The method may also include passing the playlist to a playback engine configured to download each of the plurality of chunks of audiovisual data from at least one of the multiplexed AV streams available from the content server.

To stream the media file, the playback engine may request, using the URLs in the playlist, the plurality of chunks of audiovisual data and store the retrieved chunks in a buffer on the client device. Once retrieved, to begin playback of a stream, the playback engine may retrieve chunks from the buffer and decode the audiovisual data stored therein.

In a particular embodiment, some URLs in the playlist may reference a sub-playlist, and each sub-playlist may itself provide a plurality of URLs. URLs in the sub-playlists may reference the chunks of the audiovisual data in one of the multiplexed AV streams (encoded at one of the distinct bit rates). Also, the URLs in the playlists (or sub-playlists) may include parameters specifying a beginning and ending position of a given chunk of audiovisual data within the corresponding multiplexed AV streams.

The playlists may be formatted as an M3U playlist, and in some cases may include extensions defined by the HTTP Live Streaming specification. Further, the client device may include a local web-server used to serve the generated playlists to the playback engine.

Other embodiments include, without limitation, a computer-readable medium that includes instructions that enable a processing unit to implement one or more aspects of the disclosed methods as well as a system configured to implement one or more aspects of the disclosed methods.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
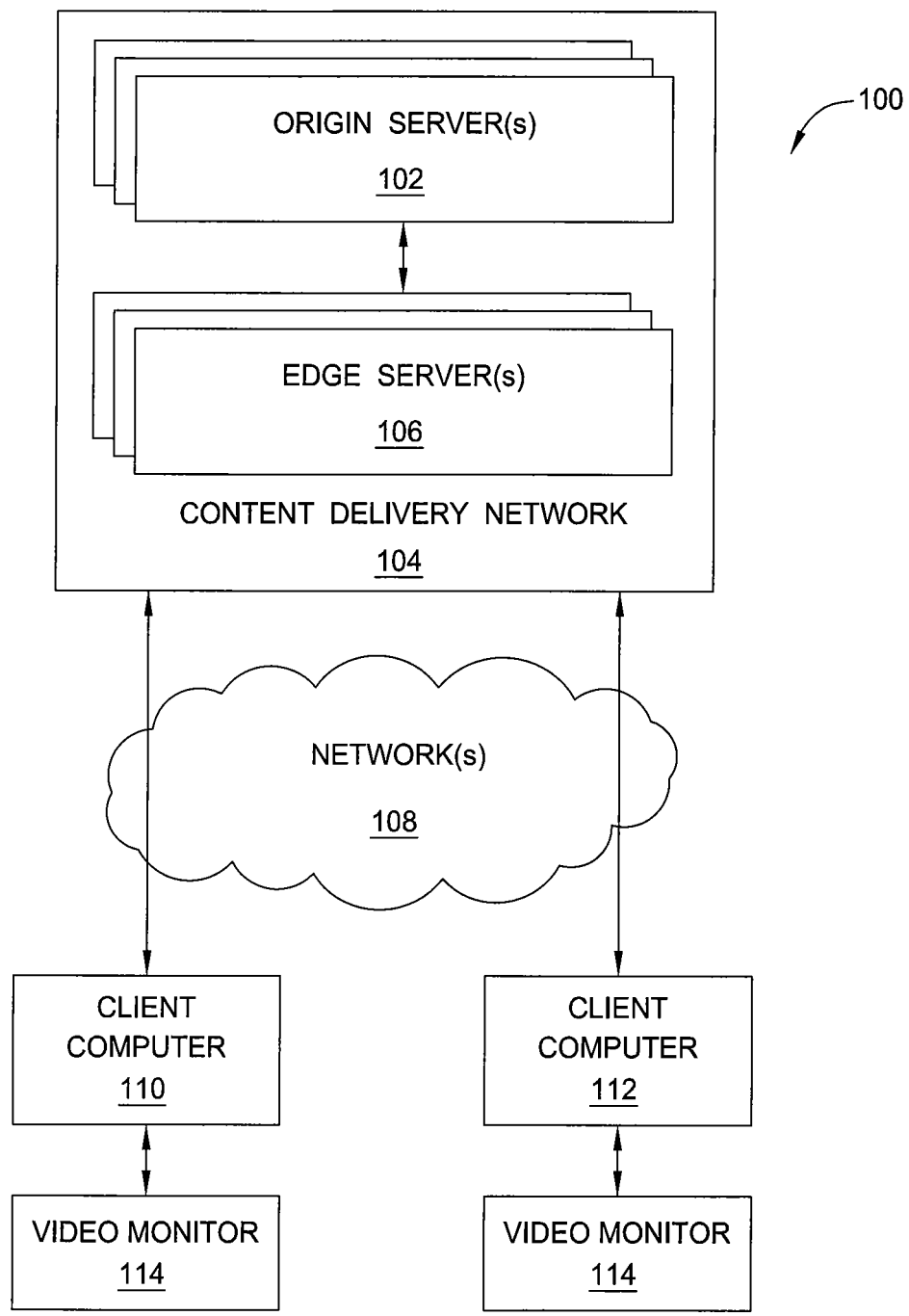
FIG. 1 illustrates a content distribution system configured to implement one or more aspects of the present invention.

Embodiments of the invention provide techniques for streaming a media file to a client device. The client device may create a playlist of dynamic virtual chunks to represent a single media stream file on a streaming media server. The playlist itself may be generated from an index in the header of a given stream defining what chunks, or segments of multiplexed audiovisual content, are present within that stream. The playlist of dynamic virtual chunks provides the playback engine on the client device with a list of individual files that may be requested from the streaming server independently of one another, despite the stream being stored on the server as a single media stream file. For example, the playlist may include of list of URLs, where each URL corresponds to a chunk in the stream file. In a particular embodiment, a URL in the playlist may include parameters indicating a beginning and ending byte offset position for the chunk referenced by the URL. When the playback engine requests a chunk, the content server packages the bytes indicated by the URL parameters and sends it to the client device for buffering and playback as though the bytes were stored on the content server as a distinct physical file.

This approach satisfies a constraint of streaming protocols which require a stream to be stored on a content server using multiple distinct files in order to allow for bit rate switching while streaming a media title. One protocol with this constraint is HTTP Live Streaming. Of course other streaming media protocols may have (or be defined with) a similar constraint. As the name implies, HTTP Live Streaming is a media streaming communications protocol that uses the well known hyper-text transfer protocol to present a media stream to a client. The HTTP Live Streaming specification defines a streaming protocol in which an overall stream is broken into a sequence of HTTP files, where each file stores one short chunk of an overall potentially unbounded transport stream. The HTTP files associated with a given stream are identified in a playlist file.

At the start of a streaming session, the client downloads the playlist, which provides a URL for each of chunk of the overall stream (or the various sub-streams encoded at different bit rate). As the stream is played, the client may select from a number of different alternate streams containing the same material encoded at a variety of data rates, allowing the streaming session to adapt to an available data rate. That is, the client may switch bit rates at any point it switches from the playback of one of the chunks to another. Generally, having small chunk sizes allows the client to both rapidly begin playback (as at least one complete chunk is required before a client can begin presenting a stream to a user) as well as to rapidly adapt to changes in bandwidth.

However, the HTTP Live Streaming specification requires that each stream be broken into physical chunks (i.e., separate files) at each point during playback where the content player may make a stream switch to manage buffer level. Further, HTTP Live Streaming does not support HTTP range requests.

For a large catalog of streams, however, the requirement that each portion of content identified in a playlist be available as a distinct file may result in an overwhelming number of files needed to be stored by a content server, especially where the stream files are broken up into small chunks. For example, assume a chunk size of four seconds is used to encode one-hundred movies at three different bit rates (averaging 90 minutes in length). In such a case, 405,000 files would be needed to store this relatively small catalog. For a content provider with a large catalog, the number of files may dissuade a content provider from providing streams using the HTTP Live Streaming specification (or other protocols that require each chunk in a playlist be accessed as a distinct file). At the same time, some client devices may not support (or allow) alternative protocols.

Accordingly, in one embodiment, URLs in the playlist are generated with parameters to supply the byte positions for a dynamic virtual chunk, i.e., a portion of a single AV stream stored on the content server. And the content server is configured to recognize these parameters, effectively, as a range request for a range of bytes within the single multiplexed AV stream. Thus, embodiments of the invention provide techniques for streaming a media file to a client device that allow a media file encoded at a given bit rate to be stored on a server as a single stream file, while at the same time allowing a playback engine on the client device to request chunks of the file as though the chunks were stored on the server as a set of discrete files. Similarly, if the media file is encoded at multiple bit rates (to allow for dynamic bit rate changes by the client), each such encoded stream may be stored as a single file and the client device may generate a playlist of URLs, providing a list of dynamic virtual chunks to the playback engine for each available bit rate.

Note however, although a particular embodiment of the invention is described using a client device which implements the HTTP Live Streaming specification as an example of a client device, it should be understood that embodiments of the invention may be adapted to for a broad variety of streaming media protocols. Accordingly, references to the HTTP Live Streaming specification are made as an illustrative example and not intended to be limiting of the present invention. Further, in the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

FIG. 1 illustrates a content distribution system 100 configured to implement one or more aspects of the present invention. As shown, the content distribution system includes one or more origin servers 102, one or more edge servers 106, networks 108, a client computer 110 and a client computer 112.

The origin servers 102 are coupled to the edge servers 106 as part of a content delivery network (CDN) 104. The origin server computer 102 is configured to store a first copy of an audiovisual media file and acts as an authoritative repository or master storage location for media files. The origin server computer 102 stores the audiovisual media file in any technically feasibly fashion on technically feasible media. For example the mass storage unit 316 may comprise a redundant array of independent disks (RAID) system incorporating a conventional file system.

Edge servers 106, of which there may be many in a particular CDN 104, typically are located logically or physically closer to the client computer 110 and the client computer 112 that the edge servers 106 serves. Each of the client computer 110 and the client computer 112, of which there may be thousands, are coupled directly or indirectly through the networks 108 to the edge servers 106. The client computers 110, 112 are not restricted to operating with one edge servers 106 as depicted but may connect to any of a large number of edge servers 106 as needed to obtain media files for decoding and display to a user.

Although, in the above description, the CDN 104 includes two levels of server, the origin servers 102 and the edge servers 106, persons skilled in the art will recognize that the architecture of FIG. 1 contemplates only an exemplary embodiment of the invention. Other embodiments may include additional middle-tier levels of servers between the origin servers 102 and the edge servers 106, or a single-tier CDN 104. Thus, FIG. 1 is in no way intended to limit the scope of the present invention in any way.

Each of the client computer 110 and the client computer 112 is coupled to a different video monitor 114 and is configured to decode received media files and deliver an output signal to the respective video monitor 114. In one embodiment, a client computer 110 and the client computer 112 may comprise a set-top box configured to receive streaming audiovisual media from the CDN 104, to convert the media to one or more output signals in a specified audiovisual format, and to provide the one or more output signals to an audiovisual output. In another embodiment, the client computer 110 or the client computer 112 may comprise a digital disc media player, such as a Blu-ray player, configured to receive streaming audiovisual media from a CDN 104, to convert the media to one or more output signals in a specified audiovisual format, and to provide the one or more output signals to an audiovisual output. In another embodiment, the client computer 110 and the client computer 112 may comprise a personal computer, laptop computer, notebook computer, or handheld computer. Embodiments also encompass a computer program product that can be loaded into a computer to perform the functions that are described herein.

In operation, the client computer 110 and the client computer 112 transmit download requests to the edge servers 106 within the CDN 104 for downloading audiovisual media files. In response to download requests, the edge servers 106 transmit the audiovisual media files (or units thereof) to requesting client computer. As noted above, the process of downloading a particular audiovisual media file from the CDN 104 for playback is referred to herein as "streaming."

Figure 2:
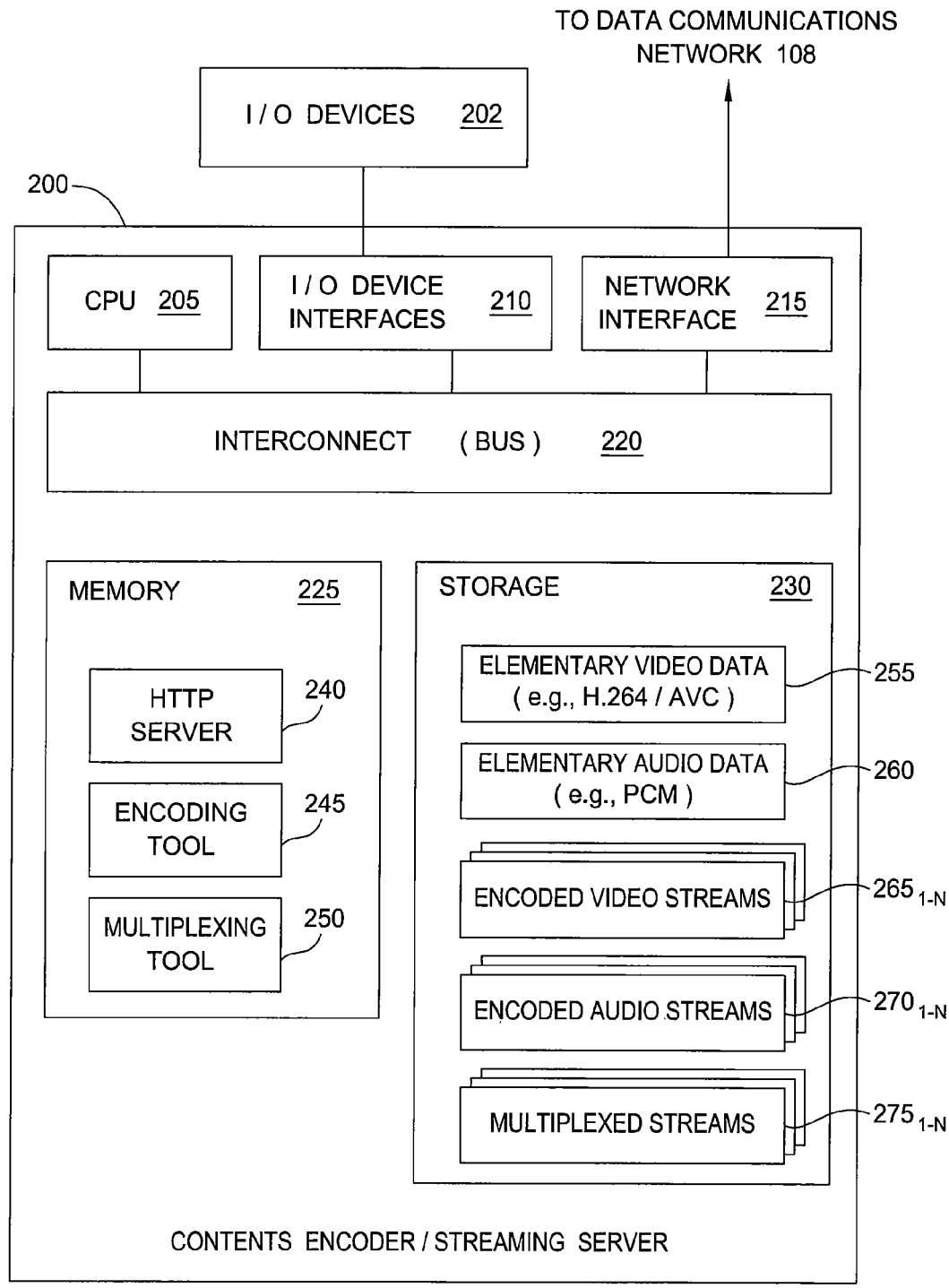
FIG. 2 illustrates a detailed view of a content encoder/media streaming server, according to one embodiment of the present invention.

FIG. 2 illustrates a detailed view of a content encoder/media streaming server 200, according to one embodiment of the present invention. As shown, the server computing system 200 includes, without limitation, a central processing unit (CPU) 205, a network interface 215, an interconnect 220, a memory 225, and storage 230. The content encoder/media streaming server 200 may also include an I/O devices interface 210 (e.g., keyboard, display and mouse devices). Of course, one of ordinary skill in the art will recognize that in practice the content encoding and streaming functions described relative to server 200 may be performed on separate computer systems.

The CPU 205 retrieves and executes programming instructions stored in the memory 225. Similarly, the CPU 205 stores and retrieves application data residing in the memory 225. The interconnect 220 facilitates transmission, such as of programming instructions and application data, between the CPU 205, I/O devices interface 210, storage 230, network interface 215, and memory 225. CPU 205 is included to be representative of a single CPU, multiple CPUs, a single CPU having multiple processing cores, and the like. And the memory 225 is generally included to be representative of a random access memory. The storage 230 may be a disk drive storage device. Although shown as a single unit, the storage 230 may be a combination of fixed and/or removable storage devices, such as fixed disc drives, floppy disc drives, tape drives, removable memory cards, or optical storage, network attached storage (NAS), or a storage area-network (SAN).

Illustratively, the memory 225 includes an HTTP server 240, an encoding tool 245, and a multiplexing tool 250, and the storage 230 includes elementary video and audio data 255, 260, encoded video and audio streams $265_{1-N}$, $270_{1-N}$, and multiplexed streams $275_{1-N}$. Each encoded audio and video file 265, 270 is included to represent a copy of the same general media file, encoded at a different bit rate. Similarly, the multiplexed streams $275_{1-N}$ each represent an interleaving of one of the encoded video streams 265 and one of the encoded audio streams 270. Of course, in practice, many distinct media titles may be available for streaming from server 200

As described in greater detail herein, the HTTP server 240 may be configured to receive and respond to requests form a client device for dynamic virtual chunks from a multiplexed stream 275. The requests may be formatted as HTTP get requests using a URL with parameters indicating byte offsets within the multiplexed file 275. That is, the HTTP server 240 may be used to stream a media file to a client device using a streaming media protocol (e.g., a mobile telephone, touchpad computer, desktop or laptop computing system), where the client device requests each portion of multiplexed audiovisual data from multiplexed stream 275 as a distinct file stored on the content server 200. For example, in one embodiment, the multiplexed streams 275 may be formatted as an MPEG-2 compliant transport stream file encoding video and audio at a specified bit rate. In such a case, the HTTP server 240 may encapsulate portions of the multiplexed stream 275 formatted as MPEG-2 packets in an HTTP stream and transmit them to the client device. In turn, the client device may buffer the portions of audiovisual data and pass them to a playback engine for decoding and playback.

In one embodiment, the encoding tool 245 may be configured to generate the encoded video and audio files 265 and 270 from elementary audio/video stream files 255, 260, such as a high-definition H.264/AVC encoded file and a raw audio stream. By sampling the elementary AV stream files 255, 260 the encoding tool 245 may generate multiple video (and potentially audio) encodings of the same media presentation, each encoded at different bit rates. Further, the multiplexing tool 250 may generate the multiplexed audiovisual streams $275_{1-N}$ from the encoded video files 265 and encoded audio files 270.

Figure 3:
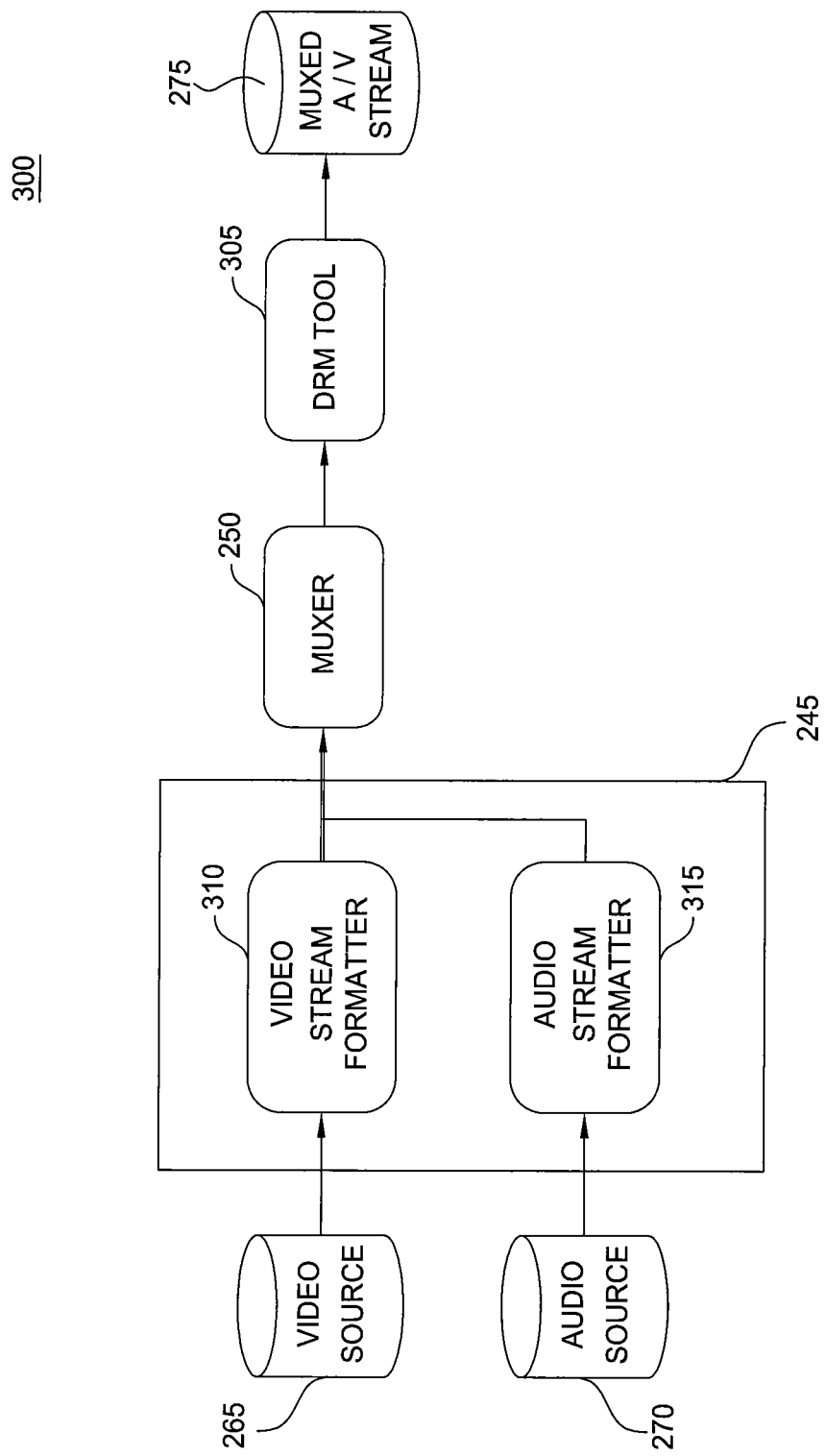
FIG. 3 is a block diagram illustrating components used to encode a media file for streaming to a client device as a collection of dynamic virtual chunks, according to one embodiment of the present invention.

For example, FIG. 3 is a block diagram further illustrating the components used to generate a multiplexed AV stream for streaming to a client device as a sequence of dynamic virtual chunks, according to one embodiment of the present invention. As shown, the video source 265 and audio source 270 are passed to a video stream formatter 310 and an audio stream formatter 315 of the encoding tool 245. The video stream formatter 310 and audio stream formatter 315 may be configured to format the audio and video data in the audio and video streams 265, 270 in a desired format (e.g., as MPEG-2 streams stored in an MPEG-2 complaint transport stream container). Once formatted, the multiplexing tool (muxer) 250 may be configured to interleave portions of audio video data to generate the resulting multiplexed stream 275. For example, in one embodiment, each encoded video streams $265_{1-N}$ is multiplexed with an audio stream 270 to produce a set of multiplexed streams $275_{1-N}$. The resulting multiplexed streams $275_{1-N}$ provide multiple copies of the same media title, each encoded with a different video bit-rate. Additionally, the multiplexer may generate an index/header describing the layout of a given AV stream.

As stated, the multiplexed stream $275_{1-N}$ may include a sequence of chunks of audiovisual content. In one embodiment, each chunk may provide approximately two seconds of audiovisual data, where portions of audio and video are interleaved every ⅔ seconds, so that ⅔ seconds of video data in a chunk is followed by ⅔ seconds of audio data, followed by ⅔ seconds of video, etc, for two seconds of video and two seconds of audio in total. In one embodiment, the resulting multiplexed AV stream 275 may be passed to a DRM (digital rights management) tool 305. The DRM tool 305 may be configured to encrypt the audio and visual content stored in the multiplexed A/V streams 275. For example, the HTTP Live Streaming specification allows for each distinct file each created for a given media title to be encrypted using AES-CBC encryption with PKCS7 padding. In such a case, each chunk of AV data in stream 275 (i.e., each two second portion of audio visual data) may be encrypted in a manner consistent with these encryption standards and the HTTP Live Streaming specification.

Figure 4:
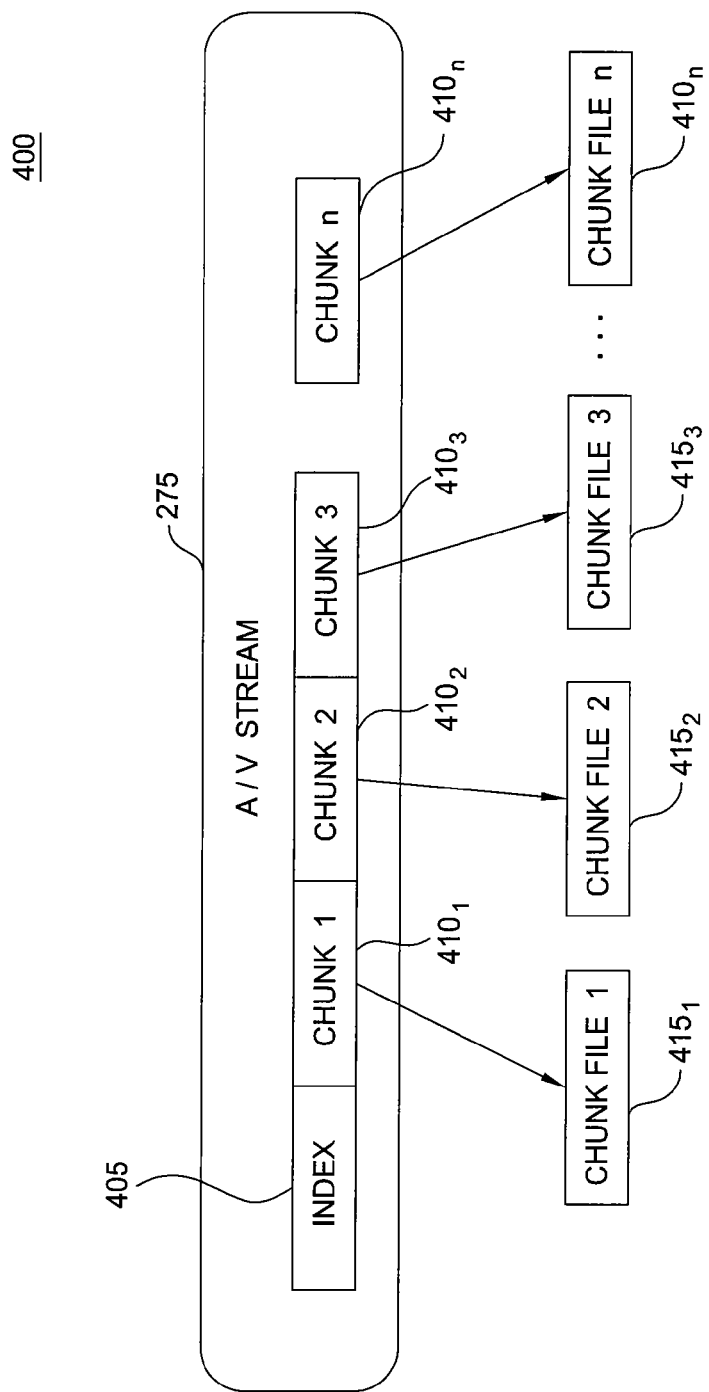
FIG. 4 further illustrates a multiplexed AV stream media file which may be streamed to a client device as a collection of dynamic virtual chunks, according to one embodiment of the present invention.

FIG. 4 further illustrates a multiplexed AV stream 275 media file which may be streamed to a client device as a collection of dynamic virtual chunks, according to one embodiment of the present invention. As shown, the AV stream 275 includes an index 405 and a sequence of chunks $410_{1-N}$. Although stored as a single AV stream 275 on a streaming server such as the origin server 102 of FIG. 1 or content encoder/media streaming server 200 of FIG. 2, the chunks $410_{1-N}$ may be presented to a client device (and playback engine) as though stored on the server as a set of discrete chunk files $415_{1-N}$. The index in the header of each multiplexed AV stream 275 identifies the byte offset boundary positions for each chunk $410_{1-N}$. Internally, each chunk $410_{1-N}$ in a given AV stream may include a collection of MPEG-2 transport packets storing a portion of the multiplexed audiovisual data encoded by that AV stream.

To provide playback continuity between AV streams 275 of the same title with different bit-rate encodings, chunks $410_{1-N}$ may be precisely aligned across different AV streams 275 to include the same portions of audio visual data. For example, "chunk 1" $410_1$ in each of multiple AV streams $275_{1-N}$ may include the same audiovisual data at different bit rates. For AV files constructed according to the MPEG-2 encoding standard, corresponding chunks in multiplexed AV streams may include the same sequence of GOPs (groups of pictures) encoded at different bit rates. Further, each of the chunks may be encoded to begin with a complete I-frame, allowing the client device to switch from one encoded to a bit rate to another without any visual artifacts (save for a general increase or decrease in video quality). Further, the index 405 may provide a byte position of each chunk as well as playback timestamps associated with the content in each chunk. In, one embodiment, the client device may be configured to build a playlist specifying a collection of URLs for retrieving each of the chunks $410_1$ as a sequence of dynamic virtual chunks (i.e., as chunk files $415_{1-N}$) from the index. The URLs may include parameters used to indicate the byte range of a given chunk, effectively providing an HTTP range-type request within the parameter of a URL. By providing a chunk file 415 in response to an HTTP get request for a URL parameterized with a begin and end position within the AV stream 275, the content server 200 can maintain the AV stream 275 as a single file on the server 200.

Figure 5:
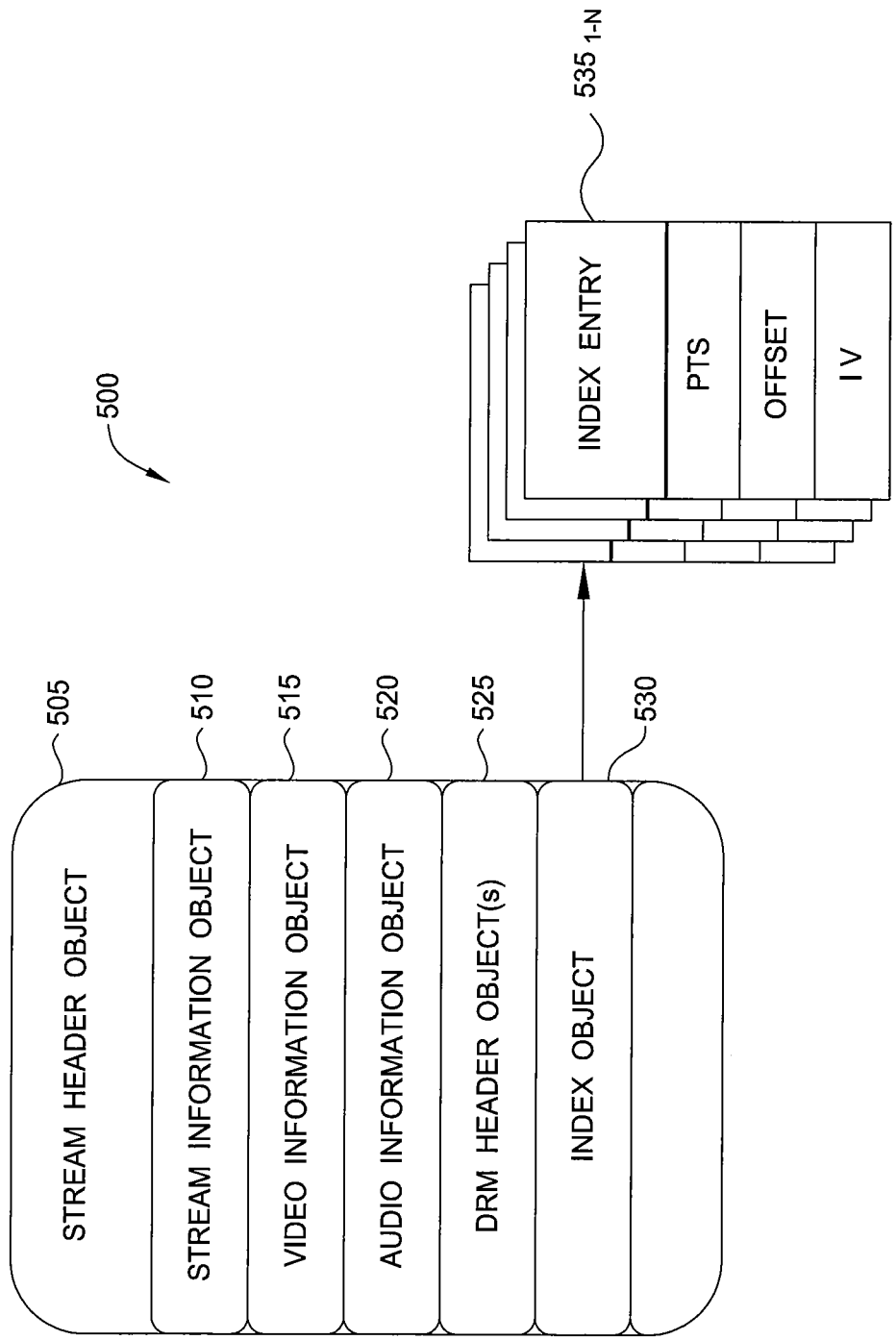
FIG. 5 illustrates an example of a header for an encoded media file which may be streamed to a client device as a collection of dynamic virtual chunks, according to one embodiment of the present invention.

FIG. 5 illustrates an example of a header 500 for an encoded media file which may be streamed to a client device as a collection of dynamic virtual chunks, according to one embodiment of the present invention. As shown, the header 500 includes a stream header object 505, a stream information object 510, audio and video information objects 515, 520, DRM header object 525, and an index object 525. The objects 505, 510, 515, and 520 may be used to store any relevant metadata for characterizing an AV stream appropriate for a particular client device. Similarly, the DRM header object 525 may be used to store appropriate encryption/decryption data/keys used to authenticate a given client's authority to access a streaming media file (e.g., by providing information needed for a client device to participate in a challenge/response authentication sequence). For example, in a particular embodiment, the client device and the server may be configured to authenticate themselves according to the PlayReady® DRM standard for portable devices published by Microsoft®, Inc. Of course, other DRM schemes or standards may be used, and further, some streaming content may be made available without using any particular DRM approach or encryption the AV data in a multiplexed streams 275.

Additionally, the header 500 also includes index object 530. As shown, the index object 530 includes a sequence of index entries $535_{1-N}$. Each index entries $535_{1-N}$ may correspond to one of the chunks $410_{1-N}$ in multiplexed streams 275. Illustratively, each index entry $535_{1-N}$ includes a presentation timestamp for a chunk 410. The presentation timestamp may be used to indicate a time position within the multiplexed streams 275 for the data corresponding to that entry 535. As shown, index entries $535_{1-N}$ also includes an offset indicating a byte position with the multiplexed streams 275 of the data corresponding to that index entry 535.

In one embodiment, when a user selects a title for streaming, the client device may download the header for each multiplexed stream 275 of that selected title available from a streaming server, as well as generate a playback list from the index entries $535_{1-N}$. For example, if a playback engine on the client device expects a media title to be streamed according to the HTTP Live Streaming specification, then the client device may generate an M3U playlist describing each chunk $410_{1-N}$ of a multiplexed AV stream 275 as a sequence of URLs, where each URL refers to the chunks $410_{1-N}$ in the multiplexed streams 275 as though they were present on the server as a collection of discrete files (e.g., as chunk files $415_{1-N}$).

Further, in one embodiment, the header 500 may be transported in a sequence of MPEG-2 transport stream (M2TS) packets having a packet ID of 0x1ff, i.e., as a sequence of M2TS NULL packets. Doing so allows the same multiplexed streams 275 to be transmitted to clients using a streaming protocol which requires a stream to be stored on a content server using multiple chunks, that is, as multiple distinct files (e.g., using HTTP Live Streaming) as well as transmitted to clients capable of accepting an MPEG-2 transport stream (M2TS) in general. In the former case, a media player on the client device may parse the headers with the packet ID of 0x1ff to obtain the header 500 associated with each multiplexed stream 275 available for a given title. And the index entries $535_{1-N}$ may be used to generate the playlist file used by a playback engine on the client device to download and each chunk of the media file. At the same time, in the latter case, other client devices may simply disregard the additional content in M2TS packets with the NULL packet ID and begin buffering MPEG-2 data following the header 500 for decoding and playback.

Figure 6:
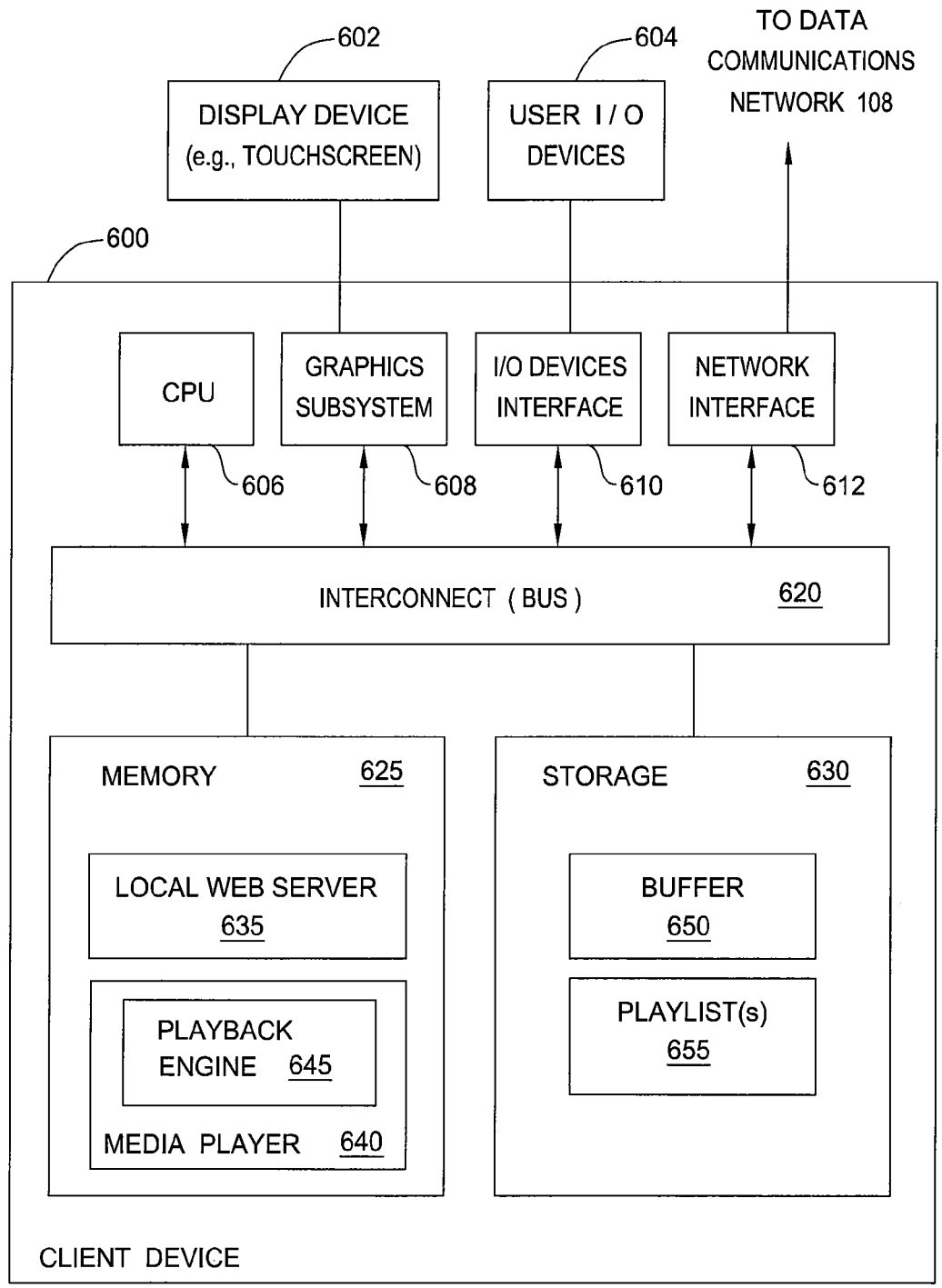
FIG. 6 illustrates a detailed view of a client device configured to download and playback a streaming media file as a collection of dynamic virtual chunks, according to one embodiment of the present invention.

FIG. 6 illustrates a detailed view of a client device 600 (which may correspond to one of the client computers 110, 112 shown in FIG. 1) configured to download and playback a streaming media file as a collection of dynamic virtual chunks, according to one embodiment of the present invention. As shown, the client device 600 includes, without limitation, a central processing unit (CPU) 606, a graphics subsystem 608, an input/output (I/O) device interface 610, a network interface 612, an interconnect 620, a memory 325 and storage 630.

CPU 606 is configured to retrieve and execute programming instructions stored in the memory 625 and storage 630. Similarly, the CPU 606 is configured to store and retrieve application data residing in the memory 625 and storage 630. The interconnect 620 is configured to facilitate data transmission, such as programming instructions and application data, between the CPU 606, I/O devices interface 610, storage 630, network interface 612, and memory 625. CPU 606 is included to be representative of a single CPU, multiple CPUs, a single CPU having multiple processing cores, and the like. Memory 625 is generally included to be representative of a random access memory. Storage 630 is representative of a variety of computer-readable storage media such as a hard disk drive, flash memory, or solid-state storage device. The network interface 612 is configured to transmit data via the communications network 108.

The graphics subsystem 608 is configured to generate frames of video data and transmit the frames of video data to display device 602. In one embodiment, the graphics subsystem 608 may be part of an integrated circuit combined with the CPU 606. The display device 602 generally represents any viewable display screen used to display/playback visual data to a user. For example, the display device 602 may be a liquid crystal display (LCD) display, CRT display, or DLP display. The input/output (I/O) device interface 610 is configured to receive input data from user I/O devices 604. Examples of user I/O devices 604 may include one of more buttons, a keyboard, and a mouse or other pointing device. The I/O device interface 610 may also include an audio output unit configured to generate an electrical audio output signal, and user I/O devices 604 may further includes a speaker configured to generate an acoustic output in response to the electrical audio output signal.

Further, although display device 602 and user I/O device 604 are shown as separate components of the client device 600, the display device 602 may itself provide a user I/O device 604 as well. For example, the client device 600 may provide a tablet computing system with a touch-sensitive display surface configured to detect and respond to user touches. This may include tapping motions, but may also include more complex finger gestures used to manipulate elements of a user interface presented on the display screen. For example, the user may launch a streaming media application configured to connect to a streaming media server and display a list media titles available for streaming by tapping an icon on the display surface with a fingertip. Further, the user may select one of the titles by tapping on the text of a title on the display screen and enter a user account or name and password combination, as appropriate, by tapping icons arranged to show a keyboard. Once selected, the client device 600 may be configured to begin streaming the selected media file for decoding and playback.

Illustratively, the memory 625 is shown storing a local web-server 635, a media player 640 which itself includes a playback engine 645, and the storage 630 is shown storing a content buffer 650 and playlists 655. In one embodiment, these components allow the client device 600 to stream a media title stored on a server as a single stream file using a playback ending 645 configured to request chunks of the media file as though the chunks were stored on the server as a set of discrete files. More generally, the media player 640 and playback engine 645 provides a software application on the client device 600 configured to manage the presentation of streaming media files to a user on the client device 600. For example, once a user selects a title for streaming, the media player 640 may be configured to obtain the header files for one or more multiplexed AV streams available from the server that encode the selected media file. From the header files the media player 640 may generate a playlist 655 which is passed to the playback engine 645. The playback engine 645, in turn, is configured to download the files listed in the playlist 655, store the downloaded content in the buffer 650, and begin decoding and presenting the audiovisual data streamed form the content server on the display device 602.

In one embodiment, the playback engine 645 implements the HTTP Live Streaming specification. In such a case, the playlists 655 may comprise M3U playlists with the extensions specified by the HTTP Live Streaming specification. Using this specification as an example, the media player 640 may generate a URL and provide it to the playback engine 645. The URL may reference an M3U playlist which is stored on the client device 600 and served by the local web-server 635. For example, the media player 640 could pass the following URL to the playback engine:

http://localhost:8080l/prog_index.m3u8.

In response, the playback engine 645 issues an HTTP get to the address in the URL, which results in a call to the local HTTP server 635. In one embodiment, the local HTTP server 635 calls back into code of the media player 640, which attempts to secure authorization for the content selected by the user. Once authorization completes, the media player 640 retrieves the stream headers for the actual content. As noted above, while the HTTP Live Streaming specification does provide for the retrieval of a decryption key for content encrypted using the AES-CBC encryption standard, it does not support DRM functions, such as user or device authentication. Accordingly, the call back into the media player 640 is used to enable the client device 600 to perform a variety of DRM related functions, including performing an authorization process between the client device 600 and a DRM server. That is, the call back into the allows the client device 600 to access content available according to a DRM scheme (e.g., the PlayReady® scheme for portable devices mentioned above).

However, while HTTP Live Streaming supports AES-CBC encryption of content, PlayReady® uses AES-CTR encryption. In order to bridge these dissimilar encryption systems, in one embodiment, a content key is carried in an envelope with a payload encrypted using the PlayReady® system. On the client device 600, a PlayReady® context is used to decrypt the envelope, and the playlist passed to the playback engine 645 includes a link to the content key (i.e., a url as shown below). The media player passes the content key to the playback engine using the local http server 635. Thereafter, information retrieved from the authorization process together with virtual chunk data read from the stream headers is then used to generate one or more playlists on the client device 600 dynamically at runtime. That is, the media player 640 downloads the headers for the multiplexed AV streams 275, and information from the headers is then used to generate one or more playlists 655 in response to a request to stream content. If the content is encoded for only a single bandwidth, only one playlist is generated. That playlist may look similar to the following:

TABLE I

M3U8 Multiplexed AV Streams Playlist Example

```
#EXTM3U
#EXT-X-MEDIA-SEQUENCE:1
#EXT-X-TARGETDURATION:6
#EXT-X-KEY:METHOD=AES-128,URI="keys/crypt0.key"
#EXTINF:6,
    http://ehub.netflix.com/high.ts/range/00001-1000000
#EXTINF:6,
    http://ehub.netflix.com/high.ts/range/1000001-2000000
#EXTINF:6,
    http://ehub.netflix.com/high.ts/range/2000001-3000000
    . . .
```

Note that this example playlist includes a URL to a content decryption key. In this case, the "keys/crypt0.key" URL implicitly points to the local HTTP server 635. However, the resource "keys/crypt0.key" may not actually exist as a physical file on the client device 600, but rather serve as a trigger to initiate an authorization process between the client device 600 and a DRM server. The result of the DRM process (if successful) is an actual decryption key. The data that makes up such a decryption key is returned to the playback engine as a result of the HTTP get issued by the playback engine 645. Advantageously, however, the underlying process remains hidden from the playback engine 645.

If the content is available in encodes for multiple bandwidths, the top-level returned playlist (i.e., the "prog_index.m3u8" referenced by the http://localhost:80801/prog_index.m3u8 URL) may itself provide a list of URLs to playlists 655. For example, the playlist 655 may contain URLs for additional sub-playlists, each corresponding to a media file on the server encoded at a different bit rate (i.e., where each URL corresponds to one of the multiplexed AV streams 275). Table II, below, provides an example of an HTTP Live Streaming playlist 655 generated by the media player 640 from the headers of three multiplexed AV streams available from a content server:

TABLE II

M3U8 Multiplexed AV Streams Playlist Example

```
#EXTM3U
#EXT-X-STREAM-INF:PROGRAM-ID=1,BANDWIDTH=1280000
    http://localhost:80801/low.m3u8
#EXT-X-STREAM-INF:PROGRAM-ID=1,BANDWIDTH=2560000
    http://localhost:80801/mid.m3u8
#EXT-X-STREAM-INF:PROGRAM-ID=1,BANDWIDTH=7680000
    http://localhost:80801/high.m3u8
```

Each individual variant playlist would then look similar to the example given in Table I. In this example, three streams (a "low" "mid" and "high" stream) are available from the server, and the playlist in Table II references a corresponding sub-playlist URL for each of the three available streams. Once an initial bit-rate is selected, the playback engine 645 requests the sub-playlist 655 for that stream. In response, the media player 640 may generate the requested sub-playlist 655.

Further, if the playback engine decides to change streams, then another one of the playlists 655 referenced in the URLs of Table I may be requested from the local web-server 635. And once requested, the media player 640 may be configured to generate the requested playlist 655, which is then served to the playback engine 645 via the local web-server 635. This process generally continues until the user discontinues playback of the media title, or until each dynamic virtual chunk listed in the playlists 655 generated by the media player is downloaded.

Figure 7:
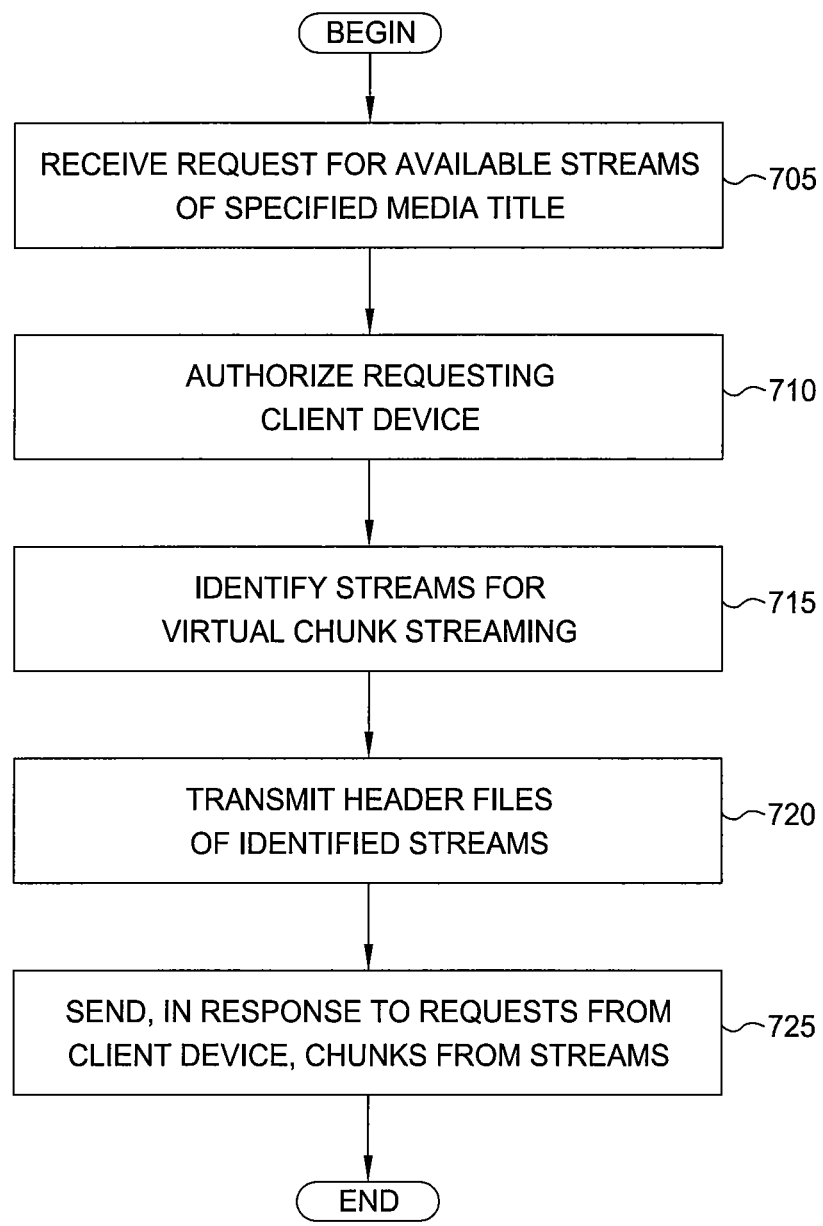
FIG. 7 illustrates a method for a content server to stream a media file to a client device as a collection of dynamic virtual chunks, according to one embodiment of the present invention.

FIG. 7 illustrates a method 700 for a content server to stream a media file to a client device as a collection of dynamic virtual chunks, according to one embodiment of the present invention. In particular, the method 700 provides an example of streaming a media file from the general perspective of the content server. As shown, the method 700 begins at step 705, where the content server receives a request for an indication of one or more multiplexed streams available for a specified media title. At step 710, the content server may authorize the requesting client device. For example, the content server may engage in a challenge/response sequence with the client device to verify that the client device is authorized to access the streams encoding the requested media title. As noted above, in one embodiment, the client device and the content server may be configured to authenticate themselves according to the PlayReady® DRM standard for portable devices.

At step 715 (assuming the client is successfully authenticated), the content server identifies the available multiplexed media streams for the requested media file. At step 720, the content server transmits the headers of the identified streams to requesting client device. And at step 725, the content server sends, in response to request form the client device, chunk files from one of the multiplexed AV streams.

As noted above, the virtual chunking of a single file may be accomplished by generating URLs in the playlist passed to the playback engine which include a start and end position within the file. Doing so allows the content server to respond to a range request in cases where the streaming media protocol does not support range requests. (e.g., when streaming a file to playback engine which implements the Http Live Streaming specification).

Figure 8:
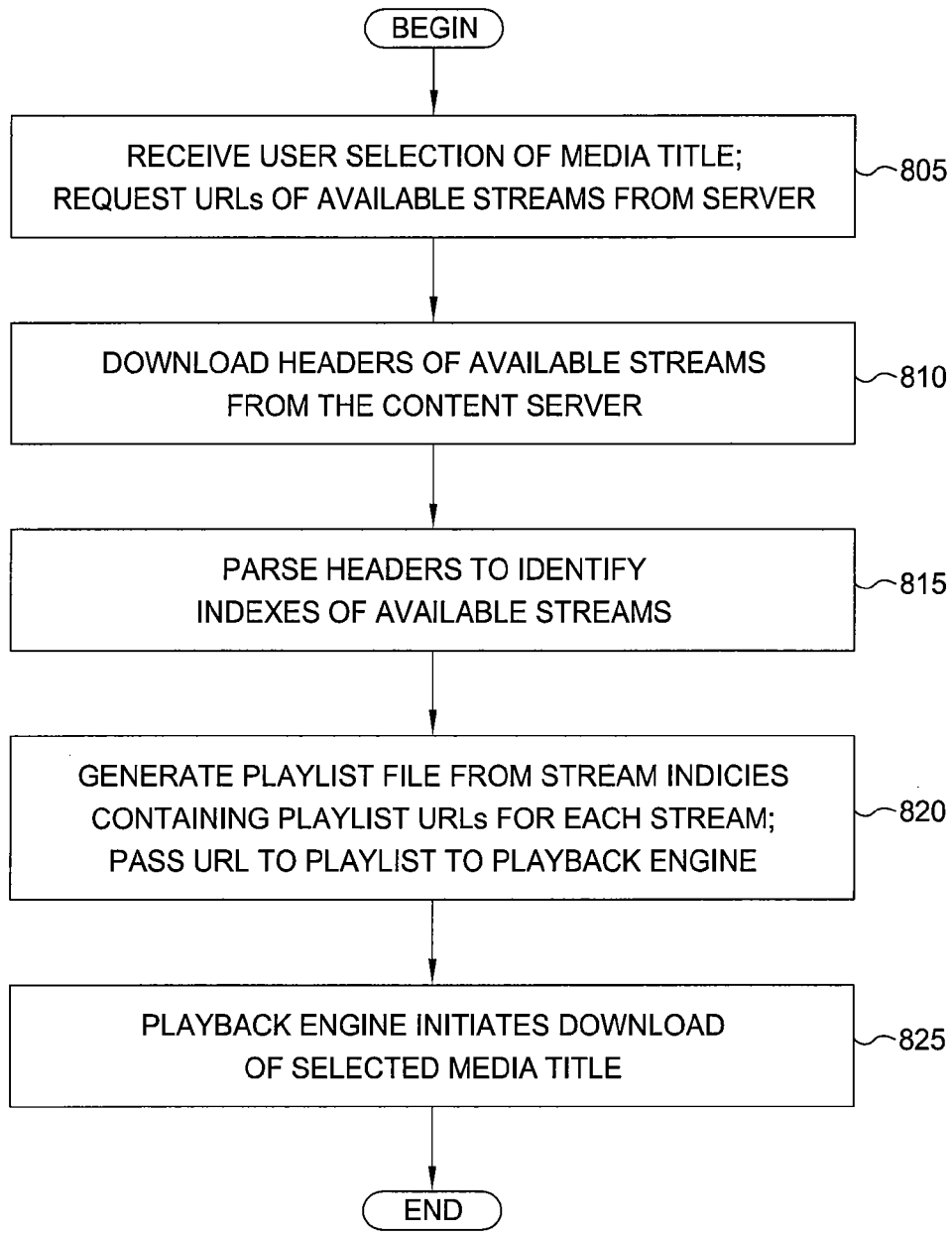
FIG. 8 illustrates a method for a client device to stream a media file as a collection of dynamic virtual chunks, according to one embodiment of the present invention.

FIG. 8 illustrates a method 800 for a client device to stream a media file to a client device as a collection of dynamic virtual chunks, according to one embodiment of the present invention. In particular, the method 800 provides an example of streaming a media file from the general perspective of the client device. As shown, the method 800 begins at step 805, where the client device receives a user selection of a media title. In response, the client device requests a list of URLs identifying one or more multiplexed AV streams available from the server. As noted above, the client and server may also engage in a challenge/response sequence to authenticate the device to the server. At step 810, the client device may download a header for each multiplexed stream available from the content server. As described above, the headers may include an index of the chunks in a corresponding multiplexed stream. At step 815, the client device may parse the headers to identify the indexes of the available multiplexed streams.

At step 820, the client device may generate a playlist file from the stream indices. If the content server encodes the media title, then the generated playlist file may contain a list of one or more sub-playlist URLs. If only a single media file is available, then the generated playlist file may include a list of URLs referencing the sequence of virtual chunks for the client device to download, buffer, and playback. At step 825, the client device passes the generated playlist file to the playback engine on the client device, which, in turn, begins downloading the requested media title using the URLs listed in the playlist.

Figure 9:
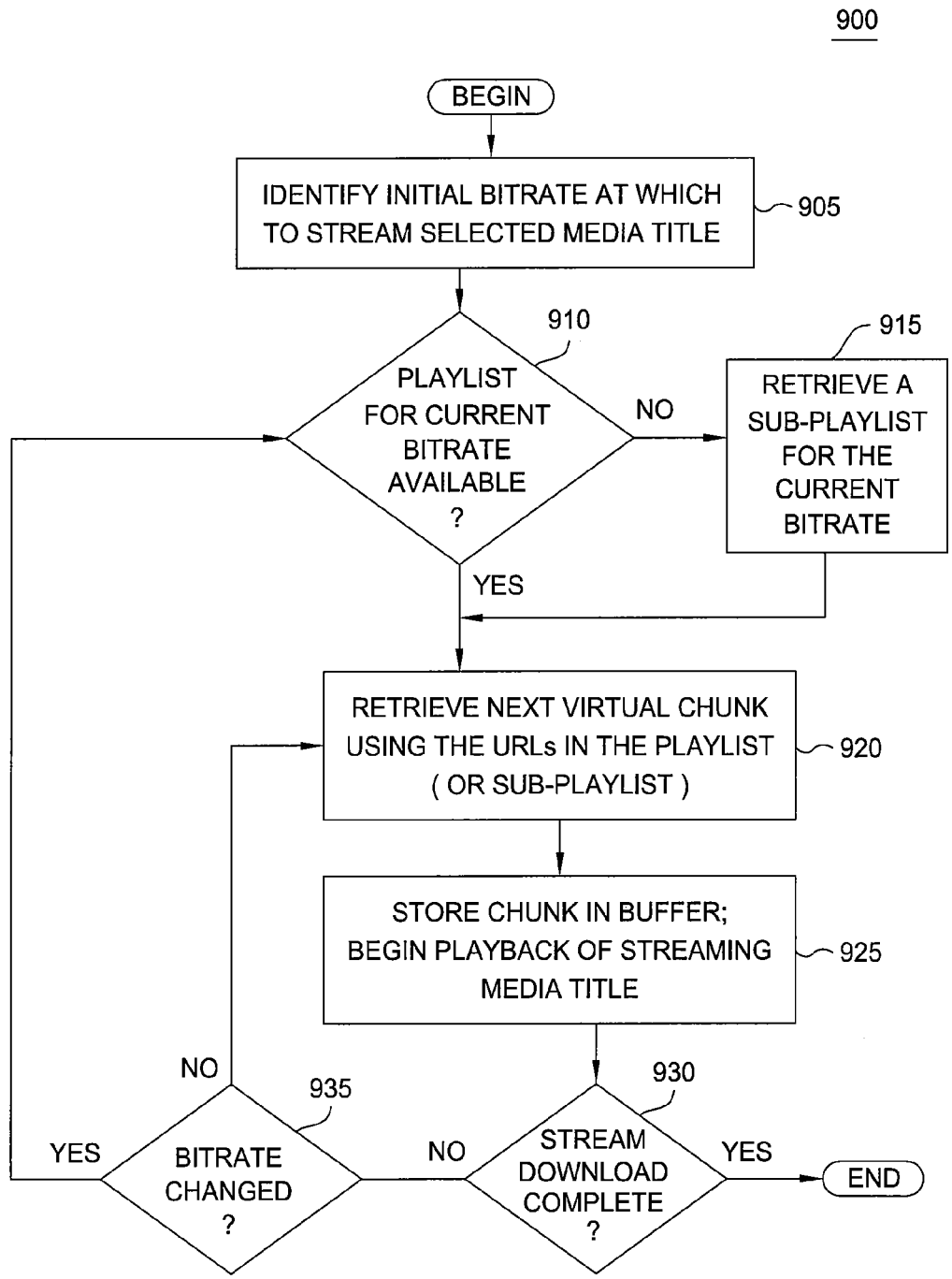
FIG. 9 illustrates a method for a playback engine on a client device to download a collection of dynamic virtual chunks, according to one embodiment of the present invention.

FIG. 9 illustrates a method 900 for a playback engine on a client device to download a collection of dynamic virtual chunks, according to one embodiment of the present invention. As shown, the method 900 begins at step 905, where the playback engine identifies an initial bit rate at which to begin streaming a selected media title. At step 910, the playback engine determines whether a playlist for the current bit rate is available. If not, then at step 915, the playback engine may retrieve a sub-playlist for the current bit-rate. For example, as described above, the playlist may be formatted according to the HTTP Live Streaming specification. In such a case, the playlist may reference a sub-playlist for each available bit rate encoding of a media title. At step 920, the playback engine retrieves the next virtual chunk identified using the URLs in the playlist (or sub-playlist). At step 925, the playback engine stores the retrieved chunk in a buffer, and the playback engine begins decoding and playing the chunks of audiovisual data stored in the buffer.

At step 930, if the complete file has been streamed to the client device, then the method 900 ends. Otherwise, at step 935, the playback engine may determine whether to change the current bit rate (e.g., based on changes in prevailing bandwidth conditions and the amount of data then present in the buffer). If the bit rate remains unchanged, then the playback engine downloads the next virtual chunk using the URLs in the playlist (step 920). Otherwise, the playback engine determines whether a playlist is available for the updated bit rate (step 910), and continues downloading virtual chunks from the content server until the complete file is downloaded. Once complete, the playback engine continues decoding AV content stored in the buffer until the complete media title has been presented to a user.

In sum, embodiments of the invention described above provide techniques for streaming a media file to a client device. Advantageously, the client device may create a playlist of dynamic virtual chunks to represent a single media stream file on a streaming media server. The playlist itself may be generated from an index in the header of a given stream defining what chunks, or segments of multiplexed audiovisual content, are present within that stream. The playlist of dynamic virtual chunks provides the playback engine on the client device with a list of individual files that may be requested from the streaming server independently of one another, despite the stream being stored on the server as a single media stream file. For example, the playlist may include of list of URLs, where each URL corresponds to a chunk in the stream file. In a particular embodiment, a URL in the playlist may include parameters indicating a beginning and ending byte offset position for the chunk referenced by the URL. This approach satisfies a constraint of streaming protocols which require a stream to be stored on a content server using multiple chunks, that is, as multiple distinct files. One protocol with this constraint is named HTTP Live Streaming. Of course other streaming media protocols may have (or be defined with) a similar constraint.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

Therefore, the scope of the present invention is determined by the claims that follow.

We claim:

1. A computer-implemented method for streaming a media title from a content server to a client device in a manner that permits bit rate switching while avoiding physical chunking, the computer-implemented method comprising:
    retrieving a distinct header for each of a plurality of multiplexed audiovisual (AV) streams of the media title and available from the content server, wherein each header stores an index describing a respective one of the multiplexed AV streams as a plurality of virtual chunks of audiovisual data encoded at a distinct bit rate, wherein each index identifies a byte offset boundary position for each virtual chunk in the AV stream corresponding to that index;
    generating, from the header associated with one or more of the multiplexed AV streams, a playlist containing a list of uniform resource locators (URLs) via which the plurality of virtual chunks of audiovisual data are individually retrievable, in order to comply with a predefined streaming protocol that requires individually retrievable stream chunks as a precondition to permitting bit rate switching during streaming; and
    passing the playlist to a playback engine configured to download, using the predefined streaming protocol, each of the plurality of virtual chunks of audiovisual data from at least one of the multiplexed AV streams available from the content server, without requiring any of the virtual chunks to be stored as a discrete, physical chunk on the content server.

2. The computer-implemented method of claim 1, further comprising:
    requesting, using one of the URLs in the playlist, at least a first one of the plurality of virtual chunks of audiovisual data; and
    storing the requested first one of the plurality of virtual chunks in a buffer on the client device.

3. The computer-implemented method of claim 2, further comprising:
    retrieving the requested first one of the plurality of virtual chunks in the buffer; and
    decoding audiovisual data stored in the first one of the plurality of virtual chunks.

4. The computer-implemented method of claim 1, wherein one or more of the URLs in the playlist reference a sub-playlist, wherein each sub-playlist includes a plurality of URLs, wherein one or more of the URLs in the sub-playlists reference one of the plurality of virtual chunks of the audiovisual data encoded at one of the distinct bit rates.

5. The computer-implemented method of claim 4, wherein each URL in the sub-playlists referencing one of the plurality of virtual chunks of audiovisual data includes parameters specifying a beginning and ending position of the virtual chunk within the corresponding one of the multiplexed AV streams.

6. The computer-implemented method of claim 1, wherein each of one or more URLs in the playlist: (i) references one of the plurality of virtual chunks of the audiovisual data encoded at one of the distinct bit rates and (ii) includes parameters specifying a beginning and ending position of the virtual chunk within the corresponding one of the multiplexed AV streams; wherein each of the plurality of virtual chunks of the audiovisual data are presented to the client device as a distinct file despite not actually being stored as a distinct file on the content server.

7. The computer-implemented method of claim 1, wherein passing the playlist to the playback engine comprises generating a URL referencing the playlist, wherein the playlist is served to the playback engine over a local web-server executing on the client device.

8. The computer-implemented method of claim 1, wherein the predefined streaming protocol does not support byte range requests, wherein the client device does not support any streaming protocol that does not require individually retrievable stream chunks as a precondition to permitting bit rate switching during streaming, wherein the predefined streaming protocol is complied with by providing, in effect, a virtual byte range request within a parameter of a URL while permitting each AV stream to be maintained as a discrete file on the content server.

9. The computer-implemented method of claim 8, wherein a call back into a media player application executing on the client device is used in order to perform at one or more predefined DRM functions, wherein the one or more predefined DRM functions include an authorization process between the client device and a DRM server separate from the content server, wherein a content key is transmitted to the client device in an envelope with a payload encrypted using a predefined encryption scheme in order to provide compatibility with a plurality of distinct encryption schemes.

10. The computer-implemented method of claim 9, wherein each index is stored in the respective header as an index object, wherein each header includes a stream header object, a stream information object, audio and video information objects, and a digital rights management (DRM) header object, wherein each header is transported in a sequence of Moving Picture Experts Group 2(MPEG-2) transport stream (M2TS) null packets in order to facilitate compatibility with both: (i) clients using the predefined streaming protocol and configured to process the null packets and (ii) M2TS clients configured to disregard the null packets.

11. The computer-implemented method of claim 10, further comprising:
    requesting, using one of the URLs in the playlist, at least a first one of the plurality of virtual chunks of audiovisual data;
    storing the requested first one of the plurality of virtual chunks in a buffer on the client device;
    retrieving the requested first one of the plurality of virtual chunks in the buffer; and
    decoding audiovisual data stored in the first one of the plurality of virtual chunks.

12. The computer-implemented method of claim 11, wherein one or more of the URLs in the playlist reference a sub-playlist, wherein each sub-playlist includes a plurality of URLs, wherein one or more of the URLs in the sub-playlists reference one of the plurality of virtual chunks of the audiovisual data encoded at one of the distinct bit rates, wherein each URL in the sub-playlists referencing one of the plurality of virtual chunks of audiovisual data includes parameters specifying a beginning and ending position of the virtual chunk within the corresponding one of the multiplexed AV streams.

13. The computer-implemented method of claim 12, wherein each of one or more URLs in the playlist: (i) references one of the plurality of virtual chunks of the audiovisual data encoded at one of the distinct bit rates and (ii) includes parameters specifying a beginning and ending position of the virtual chunk within the corresponding one of the multiplexed AV streams; wherein each of the plurality of virtual chunks of the audiovisual data are presented to the client device as a distinct file despite not actually being stored as a distinct file on the content server;
    wherein the predefined streaming protocol comprises HTTP Live Streaming, wherein the byte range requests comprise HTTP range requests, wherein the playlist is formatted, in respective instances, as an MPEG Audio Layer 3 URL (M3U) playlist and as an HTTP Live Streaming playlist, wherein passing the playlist to the playback engine comprises generating a URL referencing the playlist, wherein the playlist is served to the playback engine over a local web-server executing on the client device.

14. A non-transitory computer-readable medium including instructions that, when executed by a processing unit, cause the processing unit to perform an operation for streaming a media title from a content server to a client device in a manner that permits bit rate switching while avoiding physical chunking, the operation comprising:
    retrieving a distinct header for each of a plurality of multiplexed audiovisual (AV) streams of the media title and available from the content server, wherein each header stores an index describing a respective one of the multiplexed AV streams as a plurality of chunks of audiovisual data encoded at a distinct bit rate, wherein each index identifies a byte offset boundary position for each virtual chunk in the AV stream corresponding to that index;
    generating, from the header associated with one or more of the multiplexed AV streams, a playlist containing a list of uniform resource locators (URLs) via which the plurality of virtual chunks of audiovisual data are individually retrievable, in order to comply with a predefined streaming protocol that requires individually retrievable stream chunks as a precondition to permitting bit rate switching during streaming; and
    passing the playlist to a playback engine configured to download, using the predefined streaming protocol, each of the plurality of virtual chunks of audiovisual data from at least one of the multiplexed AV streams available from the content server, without requiring any of the virtual chunks to be stored as a discrete, physical chunk on the content server.

15. The non-transitory computer-readable medium of claim 14, wherein the operation further comprises:
    requesting, using one of the URLs in the playlist, at least a first one of the plurality of virtual chunks of audiovisual data; and
    storing the requested first one of the plurality of virtual chunks in a buffer on the client device.

16. The non-transitory computer-readable medium of claim 15, wherein the operation further comprises:
    retrieving the requested first one of the plurality of virtual chunks in the buffer; and
    decoding audiovisual data stored in the first one of the plurality of virtual chunks.

17. The non-transitory computer-readable medium of claim 14, wherein one or more of the URLs in the playlist reference a sub-playlist, wherein each sub-playlist includes a plurality of URLs, wherein one or more of the URLs in the sub-playlists reference one of the plurality of virtual chunks of the audiovisual data encoded at one of the distinct bit rates.

18. The non-transitory computer-readable medium of claim 17, wherein each URL in the sub-playlists referencing one of the plurality of virtual chunks of audiovisual data includes parameters specifying a beginning and ending position of the virtual chunk within the corresponding one of the multiplexed AV streams.

19. The non-transitory computer-readable medium of claim 14, wherein each of one or more URLs in the playlist:(i) references one of the plurality of virtual chunks of the audiovisual data encoded at one of the distinct bit rates and (ii) includes parameters specifying a beginning and ending position of the virtual chunk within the corresponding one of the multiplexed AV streams;
wherein each of the plurality of virtual chunks of the audiovisual data are presented to the client device as a distinct file despite not actually being stored as a distinct file on the content server.

20. The non-transitory computer-readable medium of claim 14, wherein passing the playlist to the playback engine comprises generating a URL referencing the playlist, and wherein the playlist is served to the playback engine over a local web-server executing on the client device.

21. A content player device to stream digital content from a content server in a manner that permits bit rate switching while avoiding physical chunking, the content player device comprising:
a memory that includes a content buffer for storing downloaded digital content; and
a processing unit coupled to the memory and configured to perform an operation comprising:
retrieving a distinct header for each of a plurality of multiplexed audiovisual (AV) streams of the digital content and available from the content server, wherein each header stores an index describing a respective one of the multiplexed AV streams as a plurality of virtual chunks of audiovisual data encoded at a distinct bit rate, wherein each index identifies a byte offset boundary position for each chunk in the AV stream corresponding to that index;
generating, from the header associated with one or more of the multiplexed AV streams, a playlist containing a list of uniform resource locators (URLs) via which the plurality of virtual chunks of audiovisual data are individually retrievable, in order to comply with a predefined streaming protocol that requires individually retrievable stream chunks as a precondition to permitting bit rate switching during streaming; and
passing the playlist to a playback engine configured to download, using the predefined streaming protocol, each of the plurality of virtual chunks of audiovisual data from at least one of the multiplexed AV streams available from the content server, without requiring any of the virtual chunks to be stored as a discrete, physical chunk on the content server.

22. The content player device of claim 21, wherein the operation further comprises:
requesting, using one of the URLs in the playlist, at least a first one of the plurality of virtual chunks of audiovisual data; and
storing the requested first one of the plurality of virtual chunks in a buffer on the client device.

23. The content player device of claim 22, wherein the operation further comprises:
retrieving the requested first one of the plurality of virtual chunks in the buffer; and
decoding audiovisual data stored in the first one of the plurality of virtual chunks.

24. The content player device of claim 21, wherein one or more of the URLs in the playlist reference a sub-playlist, wherein each sub-playlist includes a plurality of URLs, wherein one or more of the URLs in the sub-playlists reference one of the plurality of virtual chunks of the audiovisual data encoded at one of the distinct bit rates.

25. The content player device of claim 24, wherein each URL in the sub-playlists referencing one of the plurality of virtual chunks of audiovisual data includes parameters specifying a beginning and ending position of the virtual chunk within the corresponding one of the multiplexed AV streams.

26. The content player device of claim 21, wherein each of one or more URLs in the playlist: (i) references one of the plurality of virtual chunks of the audiovisual data encoded at one of the distinct bit rates and (ii) includes parameters specifying a beginning and ending position of the virtual chunk within the corresponding one of the multiplexed AV streams; wherein each of the plurality of virtual chunks of the audiovisual data are presented to the client device as a distinct file despite not actually being stored as a distinct file on the content server.

27. The content player device of claim 21, wherein passing the playlist to the playback engine comprises generating a URL referencing the playlist, wherein the playlist is served to the playback engine over a local web-server executing on the client device.

* * * * *